(12) United States Patent
Fallon et al.

(10) Patent No.: US 6,273,442 B1
(45) Date of Patent: Aug. 14, 2001

(54) FOLDING TWO WHEELED VEHICLE

(75) Inventors: Vincent Fallon, Layer Breton; Richard John Albert Moore, Bath, both of (GB)

(73) Assignee: Skoot International Limited, Colchester (GB)

( * ) Notice: Subject to any disclaimer, the term of this patent is extended or adjusted under 35 U.S.C. 154(b) by 0 days.

(21) Appl. No.: 09/623,158

(22) PCT Filed: Feb. 24, 1999

(86) PCT No.: PCT/GB99/00569

§ 371 Date: Aug. 25, 2000

§ 102(e) Date: Aug. 25, 2000

(87) PCT Pub. No.: WO99/43538

PCT Pub. Date: Sep. 2, 1999

(30) Foreign Application Priority Data

Feb. 28, 1998 (GB) .................................................. 9804231

(51) Int. Cl.⁷ ................................................. B62K 15/00
(52) U.S. Cl. ............................. 280/287; 280/30; 74/551.3
(58) Field of Search ........................ 280/287, 30, 281.1, 280/284, 304.3; 74/551.3, 551.4; D12/186

(56) References Cited

U.S. PATENT DOCUMENTS

| 3,079,172 | * | 2/1963 | Burwell . | |
|---|---|---|---|---|
| 4,598,923 | * | 7/1986 | Csizmadia | 280/287 |
| 5,029,666 | * | 7/1991 | Baldoni | 180/208 |

FOREIGN PATENT DOCUMENTS

| 3112768 | * | 3/1981 | (DE) | 280/287 |
|---|---|---|---|---|
| 3506129 | * | 8/1986 | (DE) | 280/287 |
| 2119324 | * | 11/1983 | (GB) | 280/287 |
| 2232131 | * | 12/1990 | (GB) | 280/287 |
| 85/01711 | * | 4/1985 | (WO) | 280/287 |

* cited by examiner

Primary Examiner—Brian L. Johnson
Assistant Examiner—Avraham H. Lerner
(74) Attorney, Agent, or Firm—Andrus, Sceales, Starke & Sawall, LLP

(57) ABSTRACT

A collapsible two wheeled vehicle comprises a substantially rigid main structural frame (10) defining a head section (16), a saddle pillar mount (17) and a bottom bracket (15). A rear wheel sub-frame (22) is pivoted to the frame (10) about the bottom bracket (15), and carriers a rear wheel (23), the sub-frame (22) being arranged for movement between a folded position where the rear wheel lies within the frame, between the head section (16) and the saddle pillar mount (17), and an active position where the sub-frame projects rearwardly beyond the frame. A pedal arrangement (19, 20, 21) is journalled in the bottom bracket (15) and drives the rear wheel (23) through an endless chain (25). A front wheel carrier is journalled to the head section (16) of the frame and has an arm (30) rotatably supporting a front wheel (31), the arm (30) being pivoted to the carrier for movement between a folded position where the front wheel (31) lies adjacent the rear wheel (23) when the sub-frame is in its folded position, and an active position where the arm projects generally downwardly from the carrier. The frame (1) carriers two opposed side panels (50) which are dimensioned so that the folded rear wheel sub-frame, rear wheel, front wheel carrier, folded arm and front wheel all lie substantially wholly within the confines of the side panels, the rear and front wheels lying outside the confines of the side panels when the sub-frame and arm are in their respective active positions.

28 Claims, 7 Drawing Sheets

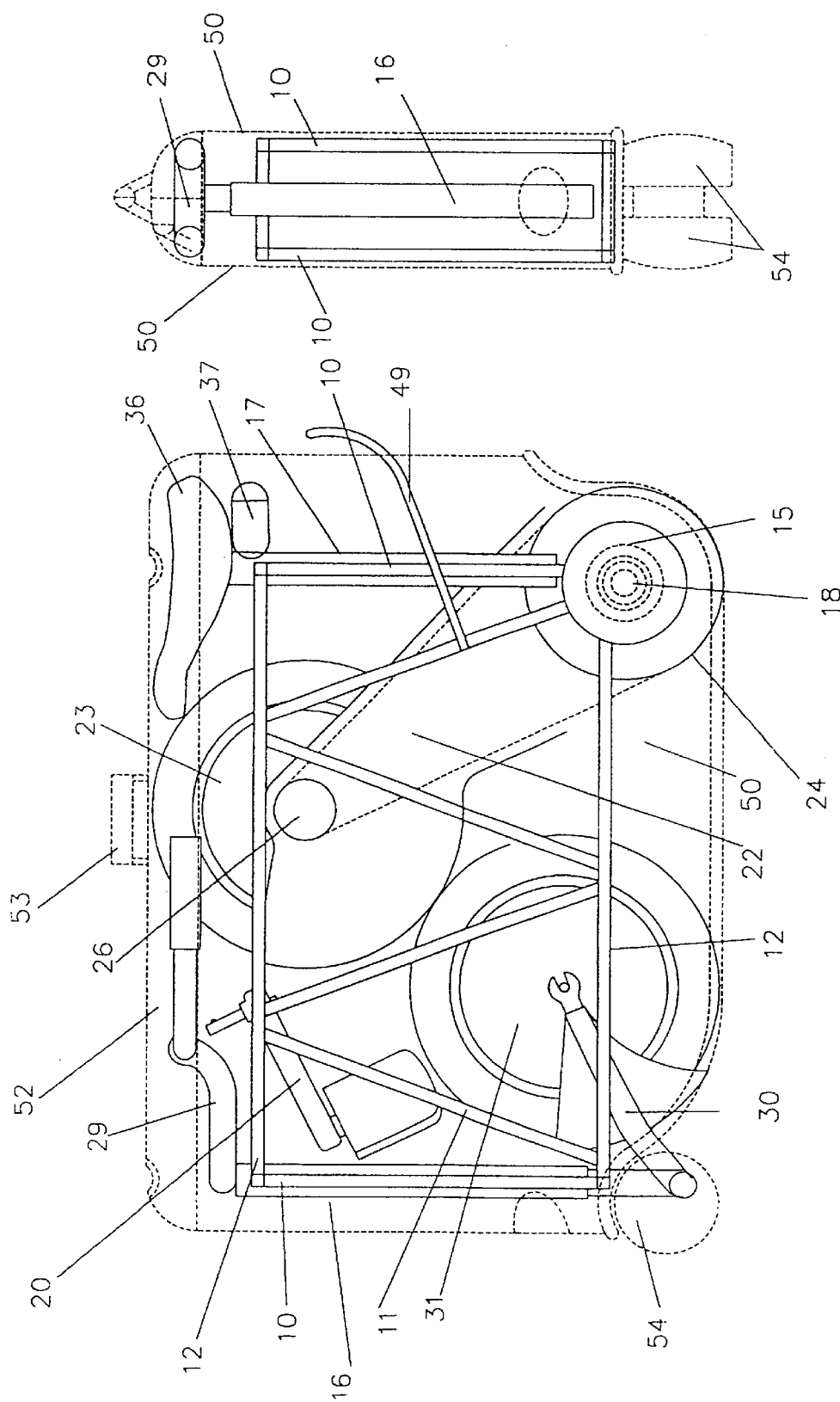

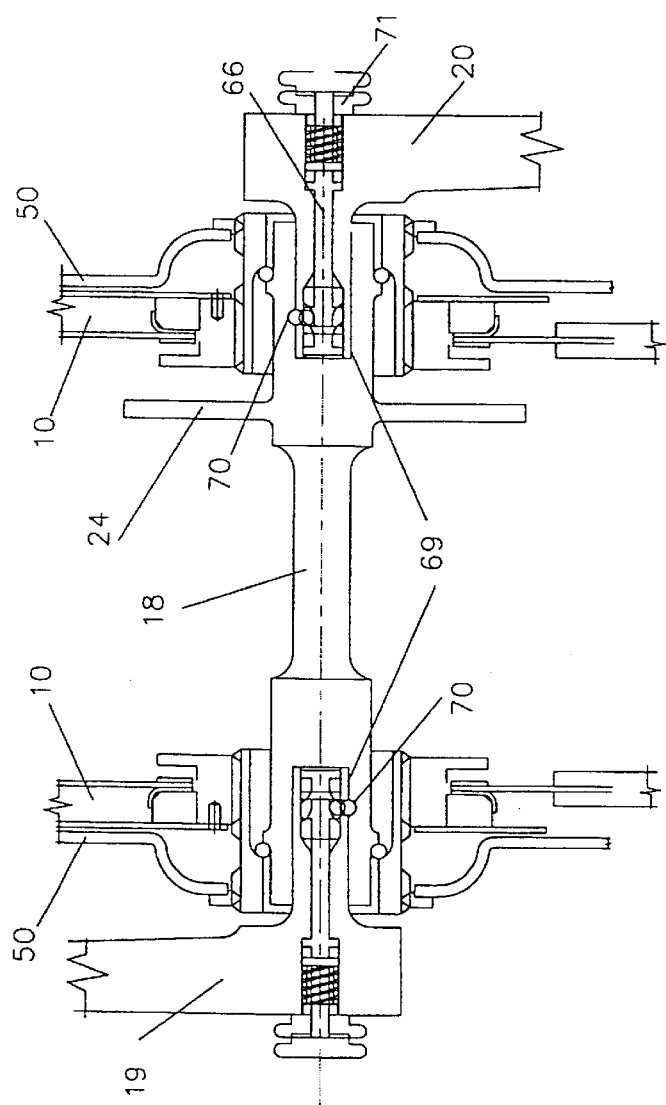
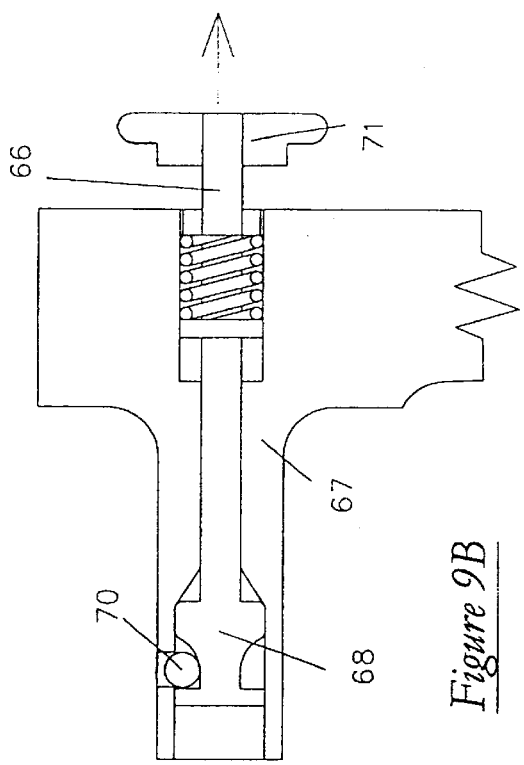
*Figure 9A*
*Figure 9B*

FOLDING TWO WHEELED VEHICLE

The present invention relates to a folding two wheeled vehicle such as a bicycle, a scooter or a lightweight pedal-assisted motorised bicycle, which may be folded so as to be easily portable when not in use as a vehicle.

BACKGROUND OF THE INVENTION

There are various designs of bicycles and scooters (hereinafter referred to simply as a bicycle) which may be folded for storage or carrying purposes. Some of these have a conventional bicycle frame of a diamond configuration and standard diameter wheels carried on arms hinged to the main frame, or removable wheels to permit folding of the frame. However, the shape and dimensions of these when folded often are most inconvenient for carrying. There have also been proposals where the main frame is designed to hinge to a collapsed position, with protruding parts hinging or telescoping with respect to the main frame, but these tend to be difficult to open out for use, or to collapse for carrying. Moreover, many designs are somewhat unstable when unfolded and so unsettling to ride. In an attempt to make a folding bicycle more easy to carry when folded, it is also known to provide a separate rigid case or flexible bag in which the collapsed bicycle is placed, but there then results the problem of transporting the case or bag, when the bicycle is in use.

In GB-2119324-A (Selars) there is described a bicycle having no main frame as such, but which has a part of a case serving as a main load bearing structure and into which may be folded a handlebar assembly and a seat assembly. The rear wheel is provided on an arm which may pivot round to lie partly within the case, the case being completed by a second part which when unfolded overlies the rear wheel. A disadvantage of this arrangement is that the main chain wheel (driven by the pedals) must be of a relatively small diameter to fit within the case and not protrude when the bicycle has been folded. To overcome this problem and obtain suitable gearing, a second large diameter chain drive wheel is provided on the pivoting arm section, so greatly adding to the mechanical complexity and weight of the structure, as a whole.

WO-85/01711-A (Miller) shows a bicycle with a case having a section hinged to the main part of the ease, to reduce the side area of the case and so to expose the rear wheel. The front wheel is arranged to be folded out and then locked in a position adjacent the lower front edge of the case. The disadvantage of this arrangement is that the length of the case will determine the distance between the front and rear wheels when the bicycle is unfolded as the location of the rear wheel axle is fixed within the case and the front wheel axle cannot lie significantly beyond the vertical front edge of the case. Since a bicycle must have a certain minimum dimension between the front and rear wheel axles for safety in use, a relatively long and consequently heavy case is required.

WO-83/03232 (Licencia Talalmanyokat) shows a bicycle which may be folded down to form a case-like structure, the case being defined by structural parts which are pivoted together and form the frame, when opened out. Such an assembly, having many pivoted parts, does not provide a rigid structure defining the required geometery for a bicycle and of necessity it has a very low gearing.

SUMMARY AND OBJECTS OF THE INVENTION

A principal aim of the present invention is to mitigate the disadvantages of the various known designs of folding bicycles, as described above, and so to provide a two wheeled vehicle which may be constructed to be light, safe in use and yet fold into an integral casing of a size which allows easy carrying or storage when not in use.

According to the present invention, there is provided a folding two wheeled vehicle comprising:

a substantially rigid unitary main structural component defering a head section for supporting a steerable front wheel, a saddle pillar mount and a bottom bracket rotatably supporting a pedal-shaft;

a rear wheel sub-frame pivoted to the main structural component about the axis of rotation of the pedal-shaft and rotatably supporting a rear wheel, the sub-frame being arranged for movement between a folded position where the rear wheel lies within the main structural component, between the head section and the saddle pillar mount, and an active position where the sub-frame projects rearwardly beyond the main structural component;

a first drive wheel carried by the pedal-shaft, a second drive wheel connected to the rear wheel, and an endless flexible tension member passing directly round the first drive wheel and the second drive wheel whereby rotation of the pedal-shaft drives the rear wheel;

a front wheel carrier journalled to the head section of the main structural component and having an arm rotatably supporting a front wheel, the arm being pivoted to the carrier for movement between a folded position where the front wheel lies adjacent but in substantially the same plane as the rear wheel when the sub-frame is in its folded position, and an active position where the arm projects generally downwardly from the carrier; and the main structural component defining or carrying panelling comprising two opposed side panels, the panelling being dimensioned so that the folded rear wheel sub-frame, rear wheel, front wheel carrier, folded arm, front wheel and first drive wheel all lie substantially wholly within the confines of the side panels, the rear and front wheels lying outside the confines of the side panels when the sub-frame and arm are in their respective active positions.

With the arrangement of this invention, there is a fixed relationship between the head section in which is journalled the front wheel carrier, the saddle pillar mount and the bottom bracket, which normally supports the pedal shaft. The relationship between these components remains constant, when the bicycle is both in its folded position and in its active (unfolded) position. In this way, the main frame of the bicycle may have the dimensions and geometry of a conventional "double-diamond frame" adult bicycle, whilst still being collapsible to a size which is readily portable.

In a preferred form of the invention, the main structural component comprises a rigid frame made up from a plurality of frame members connected together, with the panelling mounted on the frame. Conveniently, the frame may be of a space-frame construction fabricated for example from metal tubing or other material such as carbon fibre whereas the panelling may be moulded from plastics material or pressed metal. In the alternative, said two side panels may be moulded to have a relatively strong and rigid form, the panels together forming a casing defining the main structural component. The panelling thus forms a kind of monocoque construction, obviating the need for a separate frame within the panelling. Equally, the rear wheel sub-frame could be a moulded structural component.

The vehicle of this invention is primarily intended to take the form of a folding bicycle and it will hereinafter be described exclusively with reference to a bicycle. It is however to be understood that the invention is not to be regarded as limited to a bicycle.

By having the rear wheel drive arrangement as specified above, the distance between the first and second drive wheels will not change despite pivoting movement of the rear wheel sub-frame above the bottom bracket and so the tension in the endless tension member will remain constant, irrespective of the position of the rear wheel sub-frame. Thus, a conventional chain wheel set may be employed, wherein the first and second drive wheels respectively comprise sprockets and there is an endless chain extending round said sprockets, though it would be possible to use a toothed belt together with suitable pulleys.

The pedal shaft carries a pair of opposed pedals; these pedals may be folded to lie parallel to the case or released from the shaft when not required for use. By having each pedal on a respective crank arm, the crank arm itself may be releasably connected to the pedal shaft, to permit removal of the pedals. Advantageously, the crank arms and pedals may be stowed within the opposed side panels of the main structural component, when the bicycle is in its folded state.

The drive train may include an electric motor and a rechargeable battery, to give assistance to a rider, when pedalling. For example, such an electric motor may drive directly on the tire of the rear or the front wheels. A more powerful electric motor may be used to supply the principal motive force. Alternatively, a small internal combustion engine may be employed. In either case, pedals may be provided to give assistance to the motor, for example on an up-grade, though for a scooter, the pedals may wholly be omitted.

Preferred embodiments of this invention include a saddle assembly connected to the saddle pillar mount, which assembly is movable between a first position where the said assembly lies substantially wholly within the confines of the side panels and an active position where said assembly offers a saddle in a suitable position for use by a rider of the bicycle. For example, the saddle assembly may include a saddle pillar which is slidable in the saddle pillar mount, and which may be secured at a desired elevated position. The saddle pillar may itself be telescopic to give sufficient height for any given rider.

The vehicle preferably includes a handlebar assembly connected to the front wheel carrier, which assembly is movable between a first position where it lies substantially wholly within the confines of the side panels and an active position where the handlebar assembly may be used to steer the front wheel.

The handles of the handlebar assembly, a steering column forming a part of the handlebar assembly and also the carrier for the front wheel all may incorporate a similar design of locking joint which permits the parts at the joint to pivot with respect to each other, and also to be locked in an active position. Such a joint may have two parts pivoted together about a transverse axis and a sleeve which may be moved closely to surround the pivot region when the parts are aligned co-axially, the sleeve then preventing relative pivotal movement between the parts. One of the parts may have an external screw thread engageable with corresponding internal screw threads at one end of the sleeve, to secure the sleeve in its locking position. A quick-release bayonet-type of threaded connector may be employed. In addition, the sleeve may have a conical internal surface which engages a corresponding conical surface on the other part when the sleeve locks the two parts together, so as to resist relative motion between the parts.

The bicycle of this invention may be provided with suspension, at least for the rear wheel. For example, a resilient buffer may be provided between the rear wheel sub-frame and the structural member, whereby the rear wheel may perform suspension excursions, when in its active position.

The rear wheel may have a mudguard which is secured to the rear wheel sub-frame for movement therewith. Such a mudguard may incorporate a shield to envelop the chain and sprockets, to protect a user from contacting the chain and sprockets, both when the bicycle is folded and when in its active state.

The panelling may include a top cover which, when closed, extends between the side panels, when the bicycle is folded. Such a cover may comprise a pair of cover parts hinged one to each side panel respectively and moveable to an open position to permit the saddle and handlebar assemblies to be moved to their active states. Suitable profiling of the cover parts may permit them to be returned to their closed position, once the saddle and handlebar assemblies have been raised to their active states. A similar cover may be provided for the bottom of the structural component.

BRIEF DESCRIPTION OF THE DRAWINGS

By way of example only, two specific embodiments of folding bicycle constructed and arranged in accordance with the present invention will now be described in detail, reference being made to the accompanying drawings, in which:

FIG. 5 is a view similar to that of FIG. 3, but with the side panels removed for clarity;

FIG. 6 is a view similar to that of FIG. 4, but with the side panels removed for clarity;

FIGS. 9A and 9B are detail views respectively through the bottom bracket of the bicycle and one pedal crank, in a released position, on a larger scale.

DETAILED DESCRIPTION

Figures 1, 2:
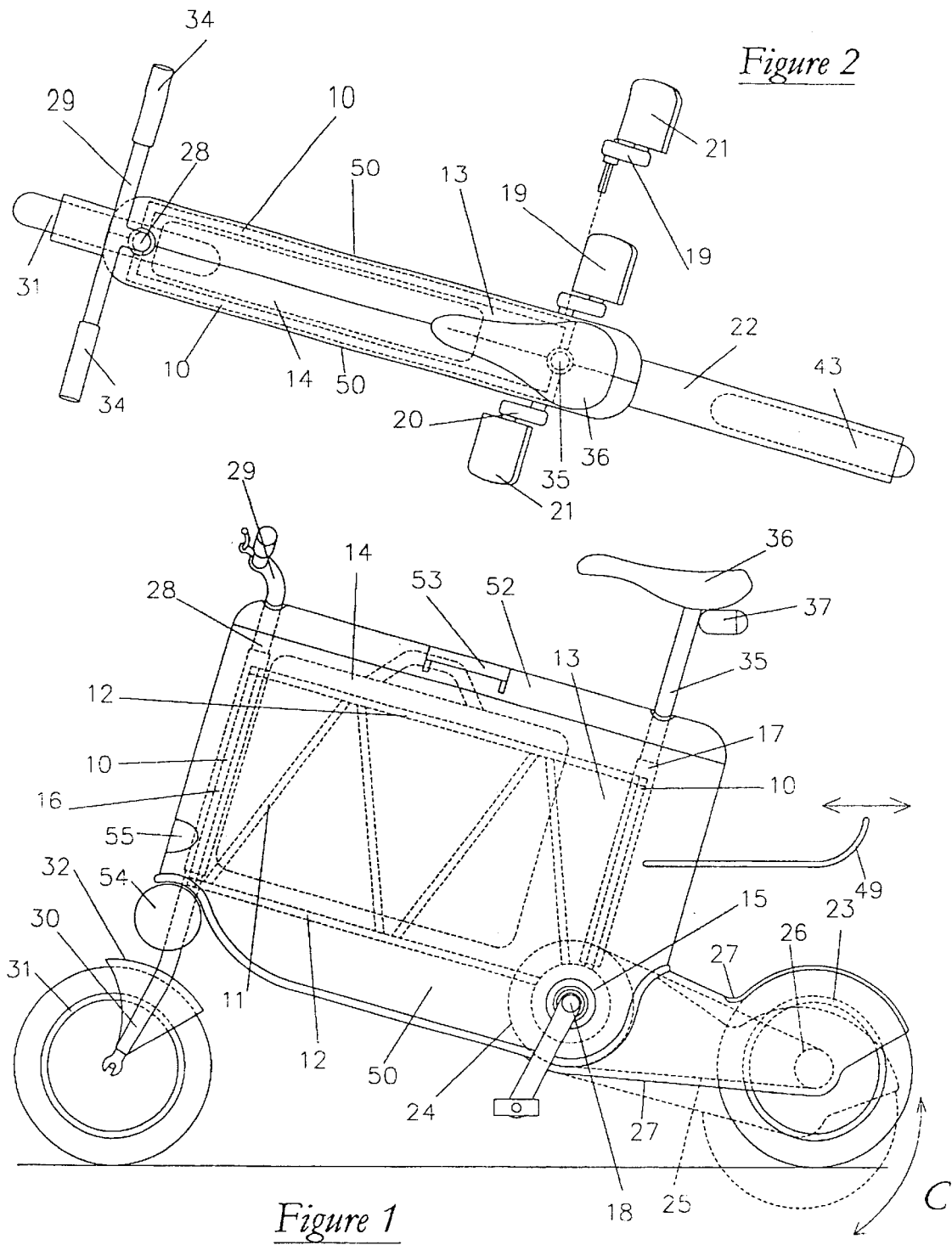
FIG. 1 is a side-view of the first embodiment of bicycle, in its active state.
FIG. 2 is a plan-view on the bicycle of FIG. 1, but also showing the connection of a pedal crank to the pedal shaft.
Figure 4:
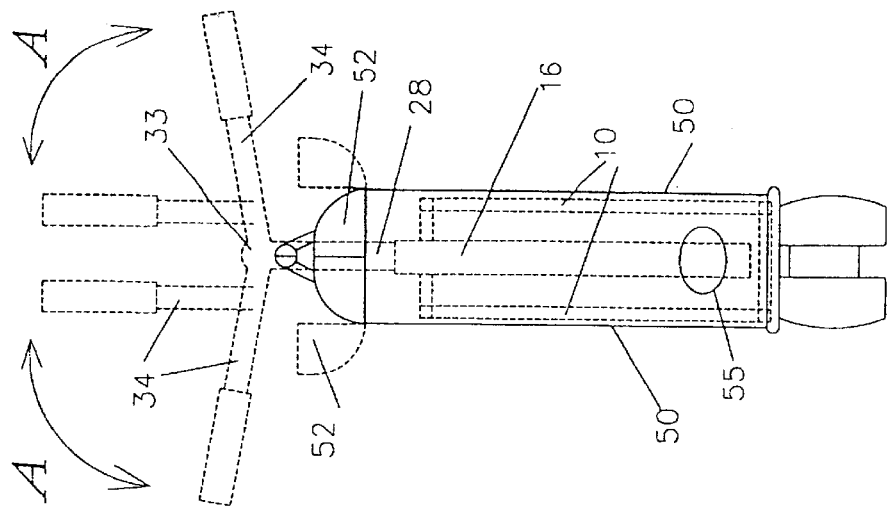
FIG. 4 is an end-view on the folded bicycle of FIG. 3, but also showing in broken lines both the handlebar assembly in its active state and the top covers open.
Figure 3:
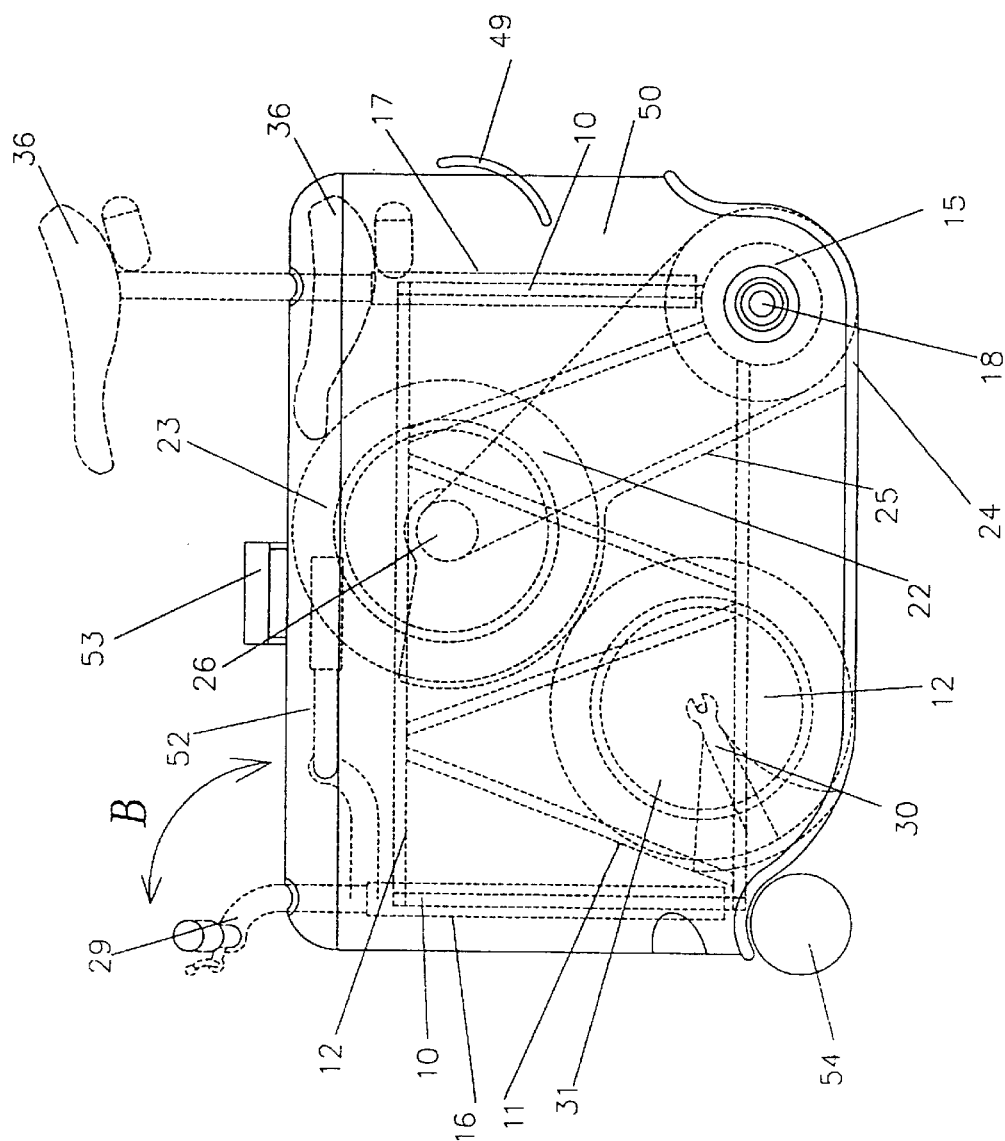
FIG. 3 is a side-view of the bicycle of FIG. 1, with the components shown in their folded states but also showing in broken lines the saddle and handlebar assemblies in their active states.

Referring initially to FIGS. 1 to 7, there is shown a first embodiment of bicycle of this invention. This comprises a main frame 10 constructed from metal (such as aluminium or titanium) members 11 welded together to form a kind of space frame, of a generally rectangular shape when viewed from the side. The frame 10 includes cross members 12, but there is a void 13 between the frame side members, able to accommodate a typical brief case or other luggage, shown in broken lines in FIG. 1 at 14. The frame could be made of other materials besides metal.

The main frame includes a bottom bracket 15, a head section 16 and a saddle pillar mount 17, all in a fixed relative disposition. The bottom bracket 15 rotatably supports a pedal shaft 18 (to be described in more detail below) which carries a pair of opposed cranks 19, 20, each crank rotatably supporting a respective pedal 21. Also journalled about the bottom bracket 15 is a rear wheel sub-frame 22 carrying at its outer end a rear wheel 23. Mounted on the pedal shaft 18 is a front chain-wheel 24 drivingly connected by a chain 25 to a rear sprocket 26, mounted co-axially with and coupled to the rear wheel. Though not shown in the drawings, a free-wheel mechanism is provided between the front chain-wheel 24 and the pedal shaft 18.

A moulded plastics chain guard 27 is attached to the rear wheel sub-frame 22 and covers the upper and lower runs of the chain 25, as well as partially enclosing the front chain-wheel 24. The guard 27 is moreover extended rearwardly so as partially to extend around the rear wheel 23 and serve as a mudguard for that wheel.

The head section 17 rotatably supports a steering column 28 having at its upper end a handlebar assembly 29 and at its lower end a pair of arms 30 between the lower ends of which is mounted a front wheel 31. The arms also support a mudguard 32 covering a sector of the front wheel.

Figure 8B:
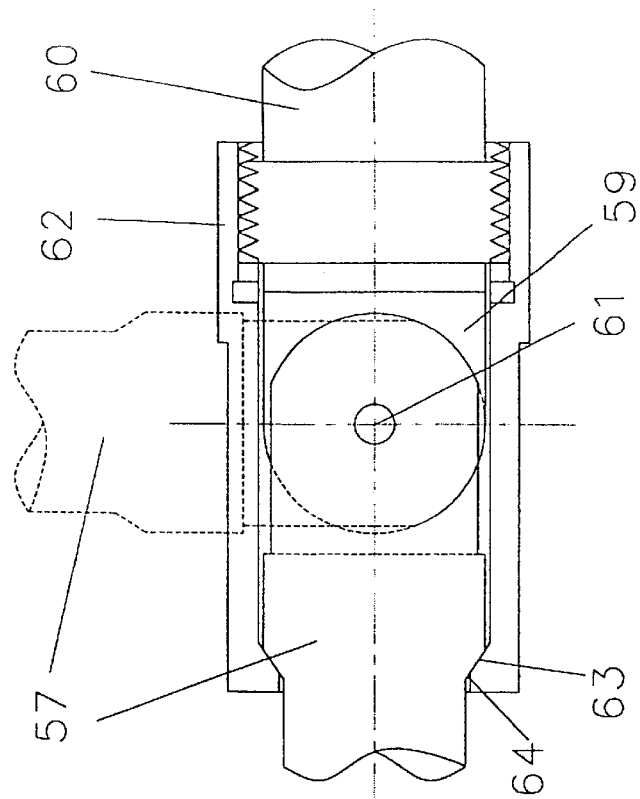
FIG. 8B is a sectional view of the joint of FIG. 8A, taken along line VIII—VIII marked on FIG. 8A.
Figure 8A:
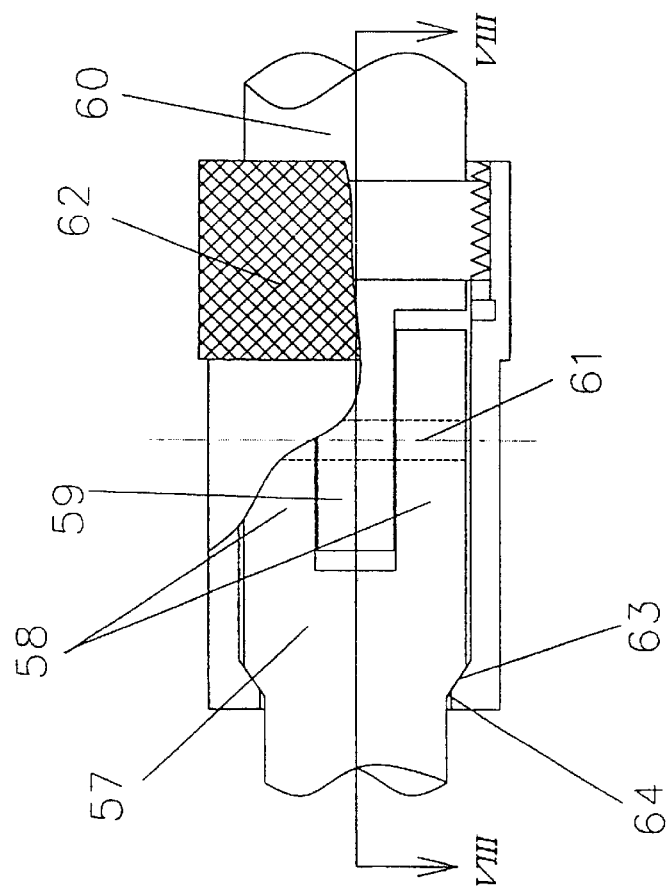
FIG. 8A is a partially cut-away view of a joint between two components, as employed in the bicycle of FIGS. 1 to 7.

The handlebar assembly 29 has a centre section 33 to which is pivoted a pair of handles 34. A joint to be described below with reference to FIGS. 8A and 8B is employed to lock the handles in their positions shown in FIGS. 1 and 2, but when released permits folding of the handles as shown by arrows A in FIG. 4. A similar joint is also provided for the centre section 33 of the handlebar assembly, to connect that centre section to the steering column 28, adjacent the head section 16. This permits the entire handlebar assembly to be folded down, as shown in broken lines in FIG. 3 and by arrow B, once the handles 34 have been folded up.

The upper ends of the arms 30 are secured to a cross member which is connected to the lower end of the steering column 28, again by a joint as shown in FIGS. 8A and 8B. When released, this permits the entire assembly of the arms 30, front wheel 24 and mudguard 32 to be folded round to the position shown in FIG. 3. A remote release may be provided for this joint, operable from within an upper part of the frame.

The saddle pillar mount slidably supports a saddle pillar 35 having at its upper end a conventional bicycle saddle 36, below which is supported a battery-powered rear lamp 37. A lock (not shown) is provided to secure the saddle pillar at a desired setting; such a lock may be similar to that employed with a conventional bicycle, having a split clamp ring together with a screw-threaded clamping member, such that tightening of the clamping member serves to grip the saddle pillar 35 and lock it against movement with respect to the frame 10. The clamping member preferably is in the form of a lever operable by hand, without the need of a spanner.

The rear wheel sub-frame 22 has a pair of spaced arms 39 (FIG. 7) each fabricated from upper and lower members 40, 41. At their forward ends, the arms are journalled to the bottom bracket 15 about the axis of the pedal shaft 18, for movement between the active state shown in FIGS. 1 and 7 and the folded state shown in FIG. 3. When in the active state, a triangular plate 56 secured to the upper members 40 engages a resilient abutment 65 provided on the main frame 10, so as to restrict further counter-clockwise movement from the position shown in solid lines in FIG. 1. However, the resilient abutment 65 permits the rear wheel to perform suspension excursions as shown by arrow C in FIG. 1.

Figure 7:
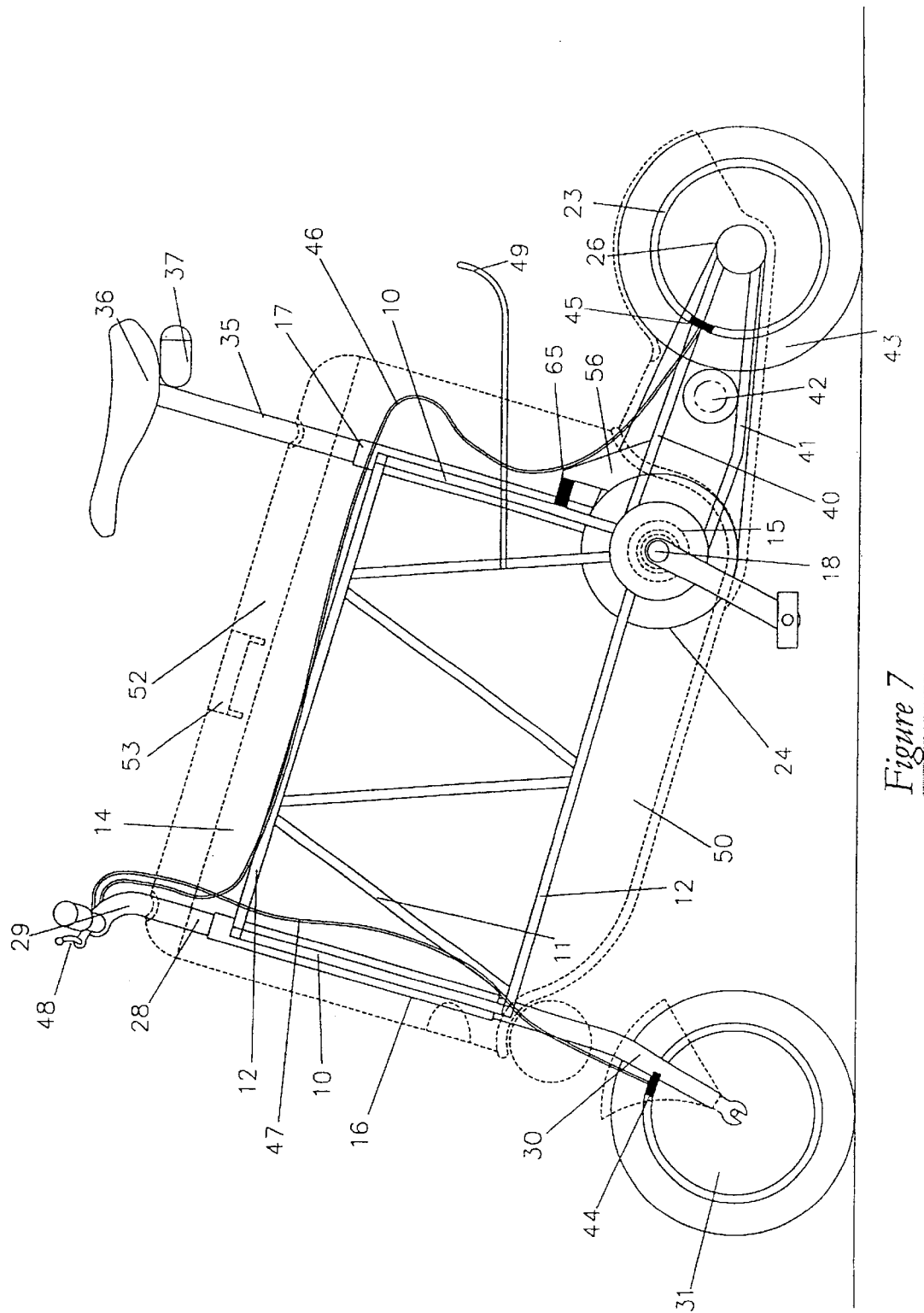
FIG. 7 is a side-view of a modified form of the bicycle of FIG. 1, but with the side panel and top cover shown in broken lines.

Also shown in FIG. 7 is an optional electric motor 42 having a drive wheel which engages the tire 43 of the rear wheel 23. A rechargeable battery may be supported by the frame 10, with a suitable control provided for the supply of electricity to the motor 42. To reduce rolling resistance, the motor may be adjustably mounted with a control provided on the handlebar assembly 29, whereby the motor drive wheel may wholly be disengaged from the tire 43.

The bicycle is fitted with front and rear wheel calliper or V-brakes 44, 45 (FIG. 7) together with Bowden cables 46, 47 connecting those brakes to brake levers 48 on the handlebar assembly. Drum or disc brakes could be used, instead.

A pair of moulded plastics side panels 50 are secured one to each side of the main frame 10 and wrap round the front and rear of the frame, so as to form an enclosure within which all of the components described above may be accommodated when the bicycle is collapsed as shown in FIGS. 5 and 6. Pivoted to the upper edge 51 of each side panel is a respective cover flap 52, moveable between a closed position shown in the drawings and an opened position shown in broken lines in FIG. 4. When opened, the handlebar assembly 29 and the saddle pillar 35 may be moved between their respective collapsed and active states, though when at either state, the cover flaps 52 may be moved to their closed position. Each cover flap is provided with a respective handle 53, which may be moved between a raised position shown in FIGS. 3 to 6 and a lowered position shown in FIG. 1, when the bicycle is to be ridden. When raised, the handles facilitate carrying of the folded bicycle.

The side panels 50 are provided at their lower front corner with a pair of rotatable ground wheels 54. When the bicycle is folded, the rear edge of case defined by the panels may be lifted by a handle 49 which is slidable between the two positions shown in FIGS. 3 and 7 respectively Using this handle, the folded bicycle may easily be wheeled on the ground wheels 54, from place to place. The handle is of U-shaped form and may also serve as a luggage rack for the bicycle.

A battery-powered headlamp 56 is built into the front face of the side panels 50, adjacent the ground wheels 54. In addition, a lock mechanism (not shown) may be provided in the side panels to prevent unfolding of one or both of the rear-wheel sub-frame 22 and the front wheel arms 30.

FIGS. 8A and 8B show the details of a joint between various components, as discussed above. This joint comprises a first part 57 defining a fork at its free end, which fork has a pair of arms 58. Between the arms is located a blade 59 provided at the free end of the second part 60, the parts being pivoted together by pin 61. A sleeve 62 surrounds the first part 57 and is provided with internal screw threads at one end, engageable with corresponding threads formed externally on a second part 60. The other end of the sleeve has an inwardly directed flange 63 formed with a conical internal surface, and engageable with a corresponding surface 64 formed on the first part 57. With the sleeve in the position shown in FIG. 8A and tightened, the first and second parts 57, 60 are secured against relative movement, but with the sleeve released from and slid clear of the second part, the two parts may move relatively through 90°, as shown in FIG. 8B.

FIGS. 9A and 9B shows the bottom bracket 15 construction, including the pedal shaft 18, front sprocket 24 and cranks 19, 20. Each crank is releasable from the pedal shaft 18 by pulling a respective headed pin 66 associated with the crank.

Each crank has a projecting square stub shaft 67, which can be inserted into a bore 69 of a corresponding square section in the pedal shaft 18. A ball 70 is held captive in a radial opening in the stub shaft 67, the pin 66 having a boss 68 engageable with the ball 70, to maintain the ball in an outwardly-projecting position, where the ball may be received in an internal groove within the bore 69. Upon the pin 66 being pulled outwardly by its head 71 against the action of a spring, the ball 70 is freed to move inwardly and thus release the stub shaft 67 from the pedal shaft 18.

The squared section of each stub shaft may be modified so as to have an irregular shape and thus to permit engagement of the stub shaft with the pedal shaft only in one unique rotational position.

Once the cranks 19, 20 have been released from the pedal shaft, they may be stored with their respective pedals within the confines of the main frame, as shown in FIG. 5.

The first of embodiment of a folding bicycle as described above may readily be collapsed down to the state shown in FIG. 5, with all components lying wholly within the confines of the side panels 50 together with the attached cover flaps 52. Spring retainers may be arranged within the main frame, to hold the front and rear wheels in the positions shown in FIG. 3, until released. When in this state, the handles 53 may be raised to permit ready carrying of the folded bicycle or the folded bicycle may be wheeled, using ground wheels 54 and the further handle 49. The folded bicycle resembles a piece of luggage and a person is protected from contact with all active components of the bicycle by the casing. The opening out of the bicycle from its folded state is relatively simple and quick to perform, to provide a bicycle which is both safe and easy to ride, having regard to the geometry and structural rigidity of the design. The release of the components from their folded states all may be performed from above, followed by the locking of the components in their active states.

Figure 11:
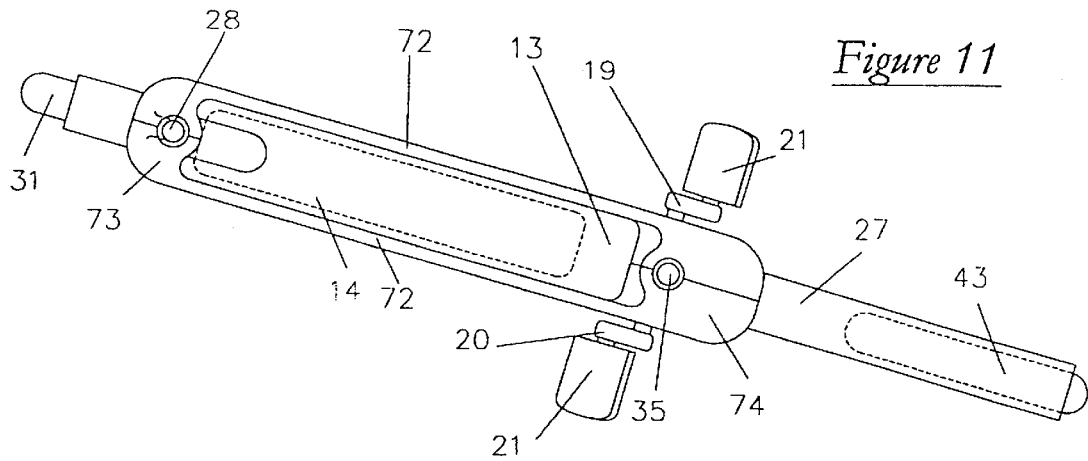
FIGS. 10 and 11 are views similar to that of FIGS. 1 and 2 but of a second embodiment of bicycle of this invention.
Figure 10:
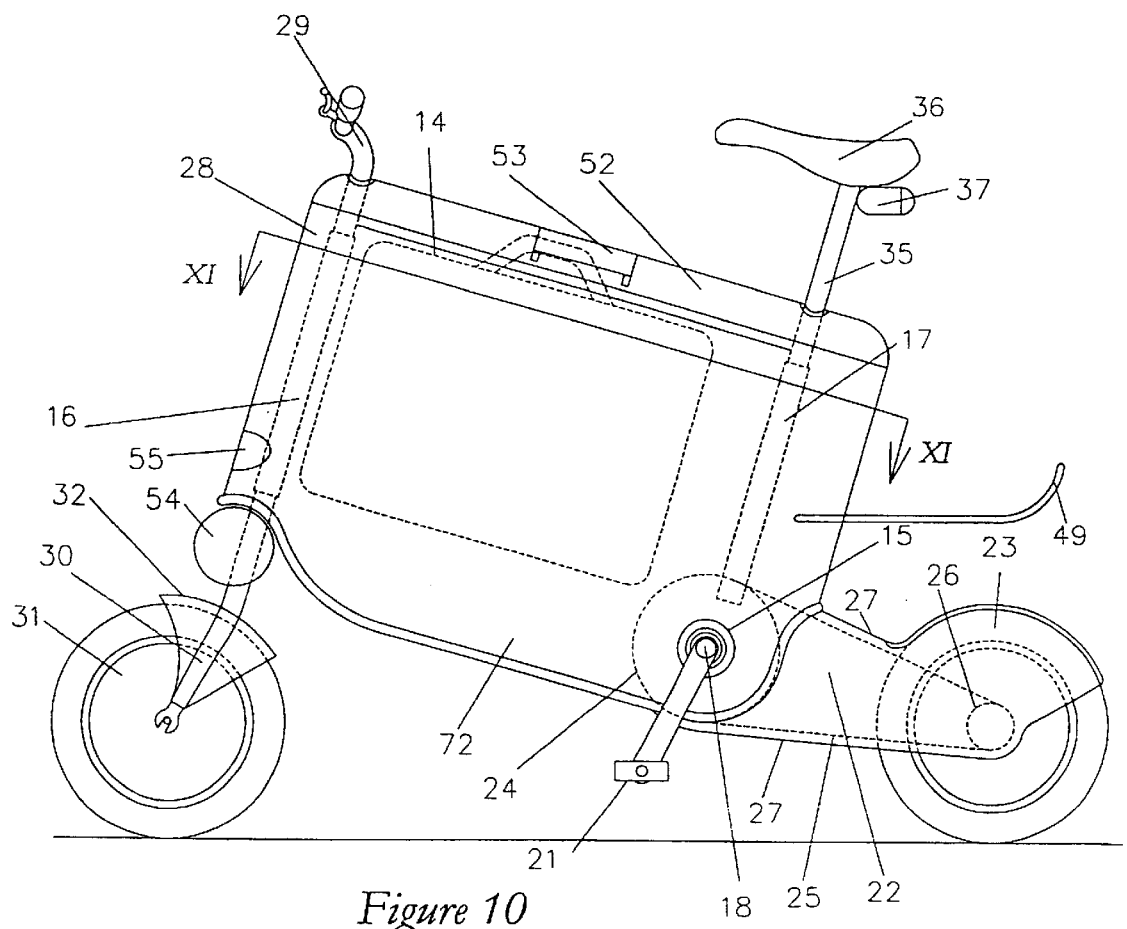

FIGS. 10 and 11 show a second embodiment of folding bicycle of this invention, with similar parts to those of FIGS. 1 to 9 being given like reference characters. The embodiment of FIGS. 10 and 11 differs from the first embodiment described above in that no separate main frame 10 is provided; rather, the side panels 72 are moulded to have sufficient strength and rigidity to serve directly as the mountings for the bottom bracket 15, head section 16 and saddle pillar 35. As best seen in FIG. 11, the mouldings are formed with thickened portions 73 (at the front) and 74 (at the rear), to permit the direct mounting therein of the respective components. Moreover, the side panels 72 define a void 13 for a conventional briefcase or other luggage, as with the first embodiment. The rear sub-frame likewise may comprise a moulded structural component to support the rear wheel 23 from bottom bracket 15.

In all other respects this second embodiment corresponds to the first embodiment and will not be described in more detail here.

What is claimed is:

1. A collapsible two wheeled vehicle comprising:
   a substantially rigid unitary main structural component defining a head section for supporting a steerable front wheel, a saddle pillar mount and a bottom bracket rotatably supporting a pedal-shaft;
   a rear wheel sub-frame pivoted to the main structural component about the axis of rotation of the pedal-shaft and rotatably supporting a rear wheel, the sub-frame being arranged for movement between a folded position where the rear wheel lies within the main structural component, between the head section and the saddle pillar mount, and an active position where the sub-frame projects rearwardly beyond the main structural component;
   a first drive wheel carried by the pedal-shaft, a second drive wheel connected to the rear wheel, and an endless flexible tension member passing directly round the first drive wheel and the second drive wheel whereby rotation of the pedal-shaft drives the rear wheel;
   a front wheel carrier journalled to the head section of the main structural component and having an arm rotatably supporting a front wheel, the arm being pivoted to the carrier for movement between a folded position where the front wheel lies adjacent but in substantially the same plane as the rear wheel when the sub-frame is in its folded position, and an active position where the arm projects generally downwardly from the carrier; and
   the main structural component carrying paneling comprising two opposed side panels, the paneling being dimensioned so that the folded rear wheel sub-frame, rear wheel, front wheel carrier, folded arm, front wheel and first drive wheel all lie substantially wholly within the confines of the side panels, the rear and front wheels lying outside the confines of the side panels when the sub-frame and arm are in their respective active positions.

2. A vehicle as claimed in claim 1, wherein the main structural component comprises a frame constructed from frame members connected together, the paneling being mounted on the frame.

3. A vehicle as claimed in claim 1, wherein the vehicle includes a saddle assembly connected to the saddle pillar mount, which assembly is movable between a first position where the said assembly lies substantially wholly within the confines of the side panels, and an active position where the said assembly may be used by a rider of the bicycle.

4. A vehicle as claimed in claim 3, wherein the saddle assembly includes a saddle pillar which is slidably mounted in the saddle pillar mount of the structural component.

5. A vehicle as claimed in claim 1, wherein the vehicle includes a handlebar assembly connected to the front wheel carrier, which handlebar assembly is movable between a first position where the said assembly lies substantially wholly within the confines of the side panels, and an active position where the handlebar assembly may be used to steer the vehicle.

6. A vehicle as claimed in claim 1, wherein respective locking means are provided to secure the rear wheel sub-frame and the front wheel arm in their respective active positions.

7. A vehicle as claimed in claim 1, wherein a resilient buffer is provided for the rear wheel sub-frame, whereby the rear wheel may perform suspension excursions when in its active position.

8. A vehicle as claimed in claim 1, wherein the first and second drive wheels respectively comprise sprockets and there is an endless chain extending round said sprockets.

9. A vehicle as claimed in claim 1, wherein the pedal shaft carries a pair of pedals, which pedals when not required for use are releasable from the shaft.

10. A vehicle as claimed in claim 1, wherein the rear wheel sub-frame includes a mud-guard for the rear wheel, which mud-guard moves with the sub-frame as the sub-frame moves between its active and folded positions.

11. A vehicle as claimed in claim 1, wherein the main structural component is provided with handles, to facilitate carrying of the folded vehicle.

12. A vehicle as claimed in claim 1, wherein at least one rotatable ground wheel is provided on a lower part of the structural component, to facilitate wheeling of the folded vehicle.

13. A vehicle as claimed in claim 12, wherein said ground wheel is provided at or adjacent a lower corner of the structural component and on the opposed end of the structural component there is provided a handle to permit the structural component to be wheeled, on the said ground wheel.

14. A vehicle as claimed in claim 1, wherein a void is defined within the main structural component when the rear wheel sub-frame and front wheel arm are in their respective active positions, in which void may be accommodated luggage.

15. A vehicle as claimed in claim 1, wherein the vehicle incorporates an electric motor or an internal combustion engine arranged to drive one of the wheels.

16. A collapsible two wheeled vehicle comprising:
   a substantially rigid unitary main structural component defining a head section for supporting a steerable front wheel, a saddle pillar mount and a bottom bracket rotatably supporting a pedal-shaft;
   a rear wheel sub-frame pivoted to the main structural component about the axis of rotation of the pedal-shaft and rotatably supporting a rear wheel, the sub-frame being arranged for movement between a folded position where the rear wheel lies within the main structural component, between the head section and the saddle pillar mount, and an active position where the sub-frame projects rearwardly beyond the main structural component;
   a first drive wheel carried by the pedal-shaft, a second drive wheel connected to the rear wheel, and an endless flexible tension member passing directly round the first drive wheel and the second drive wheel whereby rotation of the pedal-shaft drives the rear wheel;
   a front wheel carrier journalled to the head section of the main structural component and having an arm rotatably supporting a front wheel, the arm being pivoted to the carrier for movement between a folded position where the front wheel lies adjacent but in substantially the same plane as the rear wheel when the sub-frame is in its folded position, and an active position where the arm projects generally downwardly from the carrier; and
   the main structural component comprising two opposed load-bearing side panels which together form a casing, which casing is dimensioned so that the folded rear wheel sub-frame, rear wheel, front wheel carrier, folded arm, front wheel and first drive wheel all lie substantially wholly within the confines of the casing, the rear and front wheels lying outside the confines of the casing when the sub-frame and arm are in their respective active positions.

17. A vehicle as claimed in claim 16, wherein the vehicle includes a saddle assembly connected to the saddle pillar mount, which assembly is movable between a first position where the said assembly lies substantially wholly within the confines of the side panels, and an active position where the said assembly may be used by a rider of the bicycle.

18. A vehicle as claimed in claim 17, wherein the saddle assembly includes a saddle pillar which is slidably mounted in the saddle pillar mount of the structural component.

19. A vehicle as claimed in claim 16, wherein the vehicle includes a handlebar assembly connected to the front wheel carrier, which handlebar assembly is movable between a first position where the said assembly lies substantially wholly within the confines of the side panels, and an active position where the handlebar assembly may be used to steer the vehicle.

20. A vehicle as claimed in claim 16, wherein respective locking means are provided to secure the rear wheel sub-frame and the front wheel arm in their respective active positions.

21. A vehicle as claimed in claim 16, wherein a resilient buffer is provided for the rear wheel sub-frame, whereby the rear wheel may perform suspension excursions when in its active position.

22. A vehicle as claimed in claim 16, wherein the first and second drive wheels respectively comprise sprockets and there is an endless chain extending round said sprockets.

23. A vehicle as claimed in claim 16, wherein the pedal shaft carries a pair of pedals, which pedals when not required for use are releasable from the shaft.

24. A vehicle as claimed in claim 16, wherein the rear wheel sub-frame includes a mud-guard for the rear wheel, which mud-guard moves with the sub-frame as the sub-frame moves between its active and folded positions.

25. A vehicle as claimed in claim 16, wherein the main structural component is provided with handles, to facilitate carrying of the folded vehicle.

26. A vehicle as claimed in claim 16, wherein at least one rotatable ground wheel is provided on a lower part of the structural component, to facilitate wheeling of the folded vehicle.

27. A vehicle as claimed in claim 26, wherein said ground wheel is provided at or adjacent a lower corner of the structural component and on the opposed end of the structural component there is provided a handle to permit the structural component to be wheeled, on the said ground wheel.

28. A vehicle as claimed in claim 16, wherein a void is defined within the main structural component when the rear wheel sub-frame and front wheel arm are in their respective active positions, in which void may be accommodated luggage.

* * * * *